Dec. 4, 1962

C. K. BILLEB 3,066,848

EASY OPENING THERMOPLASTIC WRAPPER

Filed Oct. 21, 1957

INVENTOR.
C. K. Billeb
BY
Lieber & Lieber
ATTORNEYS.

United States Patent Office 3,066,848
Patented Dec. 4, 1962

3,066,848
EASY OPENING THERMOPLASTIC WRAPPER
Clyde K. Billeb, Shorewood, Wis., assignor to Milprint,
Inc., Milwaukee, Wis., a corporation of Delaware
Filed Oct. 21, 1957, Ser. No. 691,211
6 Claims. (Cl. 229—87)

The present invention relates generally to improvements in the art of packaging commodities, and relates more particularly to improvements in the fabrication of commodity wrappers formed of inherently thermoplastic films.

A primary object of the invention is to provide a novel and improved commodity wrapper formed of inherently thermoplastic sheet material adapted to be closed by heat sealing and which is simple to produce and highly efficient in use while being readily operable for access to the product.

It has, of course, long been common practice in the packaging industry to protectively confine diverse products in flexible containers or wrappers formed of various types of sheet materials for merchandising purposes. It has also been found throughout the years that it is most desirable to package certain commodities, particularly foods, in transparent or partially transparent containers or wrappers in order to enable the prospective purchasers to view the enwrapped product. Furthermore, it is an accepted fact that the packaging materials thus used should possess such desirable characteristics as economy, receptiveness to printing, durability and stability under diverse conditions, ease of handling and fabrication, good sealability and the like.

Various films have accordingly been introduced to the packaging field in efforts to obtain these desirable qualities, and some of the more popular transparent or translucent films which have become popular are a regenerated cellulosic film commonly known as "cellophane," a rubber hydrochloride film sold commercially under the name "Pliofilm," a thermoplastic resin film known as "Saran," certain vinyl and nylon films, and polyethylene film. However, while at least some of these films posses certain of the desired characteristics, they are generally lacking in some of the specified qualities or have not heretofore been adapted successfully to all merchandising requirements such as ease of opening for access to the product.

For instance, cellophane possesses good clarity and transparency and may be rendered receptive to printing, but this film has hard texture and cold touch or feel qualities, is relatively expensive, is subject to deterioration under some conditions and requires special coating treatment to render it heat sealable. Glassine lacks clarity and transparency, is not of its heat sealable and also has a hard texture and cold feel. As for the inherently thermoplastic films such as Pliofilm, Saran, polyethylene, vinyl and nylon, they have been found to possess exceedingly good physical properties for protecting enwrapped products, are strong and durable under diverse conditions, have generally good clarity and transparency, are of soft texture and touch, and naturally are inherently heat sealable or fusable.

However, despite the attributes of the inherently thermoplastic films, they possess a common disadvantage, namely, the difficulty in opening packages fabricated therefrom. Since these films are inherently thermoplastic, the adjacent surfaces at the overlapping or overlying portions are fused or welded directly to each other during the heat sealing thereof, and the sealed areas thus become so strong and durable that it is frequently necessary to mutilate the wrapper or container in order to obtain access to the commodity unless special opening devices such as tear tapes are provided. The mutilated wrapper then serves no further to protect the commodity, and particularly in cases wherein the packaged product is dispensed more-or-less piecemeal, this is a distinct objection.

It is therefore a more specific object of the present invention to provide an improved commodity wrapper and final package which obviate the aforementioned objections and disadvantages.

Another specific object of this invention is to provide an improved commodity wrapper formed of inherently thermoplastic material adapted to be sealed by application of heat and which, after having been thus sealed, may moreover be readily opened for access to the commodity without need for destroying or mutilating the wrapper.

Another specific object of the invention is to provide an improved inherently thermoplastic commodity wrapper having heat sealable areas treated in a novel manner whereby access to the final package may be readily obtained without the use of special tools or opening devices.

Still another specific object of my invention is to provide an improved inherently thermoplastic and heat sealable commodity wrapper which may be rapidly produced in large quantities and at low cost and which may moreover be readily utilized in packaging diverse products with the aid of ordinary and commercially available heat sealing equipment.

An additional specific object of the present invention is to provide an improved commodity wrapper formed of inherently thermoplastic and heat sealable film having selected sealable areas thereof coated with an interrupted layer of a material having greater heat resistance than the base film.

A further specific object of the present invention is to provide an improved commodity package in which the protective wrapper constitutes an inherently thermoplastic sheet material sealed along overlapping areas by fusion of the adjacent overlapping portions in an interrupted pattern.

These and other specific objects and advantages of the invention will become apparent from the following detailed description.

A clear conception of the features constituting the present improvement and of the mode of fabricating and of utilizing wrappers embodying the invention in the packaging of commodities may be had by referring to the drawing accompanying and forming a part of this specification wherein like reference characters designate the same or similar parts in the several views.

Figure 1:
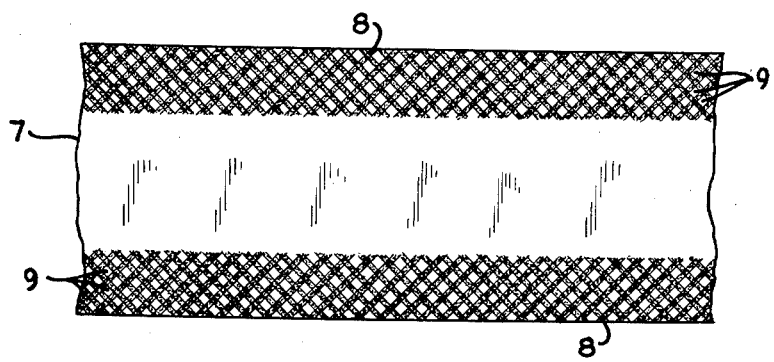
FIG. 1 is a fragmentary plan view of a typical wrapper sheet or web of wrapping material illustrating a preferred embodiment of the invention.

While the invention has been specifically shown and described herein as especially applicable to advantage in the packaging of food commodities such as bread and as being embodied in a wrapper sheet of inherently thermoplastic film such as polyethylene having selected areas coated in a lattice-work pattern or design with a heat resistant lacquer, it is not desired to unnecessarily limit or restrict the improvements or utility thereof by reason of such specific embodiments since the improved wrappers may be advantageously utilized in the packaging of various commodities and may be fabricated of other inherently thermoplastic films having interrupted or open mesh coatings of any suitable material having greater heat resistance than the base sheet. It is also contemplated that certain specific descriptive terms used herein shall be given the broadest possible interpretation consistent with the disclosure.

Referring to the drawing, the improved commodity wrapper comprises, in general, a flexible, preferably transparent, sheet 7 of inherently thermoplastic material such as polyethylene film having selected marginal areas 8 coated on at least one side in an interrupted or open mesh pattern or design with a material such as lacquer or varnish having a greater resistance to heat than the base sheet 7. While the coating has been shown in the present instance as being applied in a lattice-work or cross-hatched pattern to marginal portions of the sheet 7, it should be noted that the pattern in which the coating is applied may be varied considerably as desired as long as the coating is interrupted by open spaces or areas 9, and this coating is applied to any portions of the sheet which are to be overlapped and heat sealed.

Figure 2:
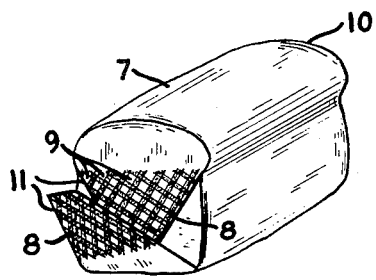
FIG. 2 is a perspective view showing the wrapper being applied to a commodity such as a loaf of bread.
Figure 3:
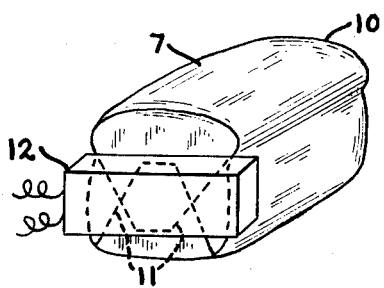
FIG. 3 is a similar perspective view illustrating the sealing operation on the treated and folded end portion of the wrapper.
Figure 4:
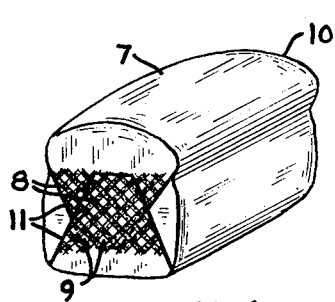
FIG. 4 is another similar perspective view of the final sealed commodity package.

In packaging a product such as a loaf of bread 10, it is only necessary to wrap the product within the wrapper sheet 7, as shown in FIG. 2, with the coated portions 8 in folded and/or overlapping relation, as at 11, and to thereafter apply sufficient heat and pressure to the folded areas to activate the inherently thermoplastic base film exposed through the interrupted portions in the coated area 8, as shown in FIG. 3, thus causing fusion of the adjacent faces or plies within the open spaces 9. The sealing operation may be performed with the aid of any suitable heat sealing plate or bar 12 as shown, and the final sealed commodity package is shown in FIG. 4 in which the folded overlapping portions 11 are secured by fusion only within the open spaces 9 of the coated areas 8 due to the resistance of the coating to the sealing heat. The resultant more-or-less tack seal in which the spaces 9 are all bounded by coated and unsealed areas has been found sufficiently strong to adequately protect the packaged product while permitting ready opening or separation of the flaps or folds 11 for access to the package without need for mutilating the wrapper.

The base sheet 7 may be formed of any one of several inherently thermoplastic films such as polyethylene, Pliofilm, Saran, vinyl or nylon from one to two mil thickness and having a relatively low melting point and good heat sealing characteristics as compared to such films as Mylar and having relatively low moisture vapor permeability as compared to polystyrene and cellulose acetate. The desired properties of the selected thermoplastic films are good heat-sealability, soft pliable feel, good strength and durability, good moistureproofness, transparency, and stability under diverse conditions. As for the coating material, any commercially available lacquer, varnish, shellac, or ink may be selected which has a higher melting point and therefore greater heat resistance than the base sheet so as to prevent a positive seal, or perhaps no seal whatsoever, in the coated areas when sufficient heat is applied to activate and seal the base sheet in the clear film areas or open spaces 9, and the coating material therefore depends somewhat on the particular film used as a base sheet. Likewise, the pattern of the coating may be varied dependent upon the strength of the seal desired, and a lattice work or cross-hatch pattern, polka dot design, herringbone pattern or others may be used with the thickness of the coated strips and sizes of the open uncoated spaces 9 being varied to meet requirements. For example, if a strong seal is desired, a more open design in which the uncoated spaces 9 expose a greater percentage of the base film is utilized, but if only a relatively superficial seal is desired, a coarse screen or more closed design is used in which a higher percentage or greater area is coated and the exposed uncoated area is less. As for the thickness of the coating, this is more-or-less dependent upon the material used but is generally approximately one pound per ream.

As a specific example, a transparent sheet of polyethylene of one and one-half mil thickness was coated along marginal portions in a lattice-work design, as shown in the drawing, with a lacquer consisting of a nitrocellulose solution, plasticizers and ethyl acetate, but certain commercially available varnishes may be substituted for the lacquer. The coating material was applied approximately one pound to the ream, and a good strong but readily openable seal was effected with the aid of sufficient heat to activate and cause fusion of only the uncoated open areas 9.

It is not intended or desired to limit this invention to the exact details of construction or to the precise mode of use herein shown and described, since various modifications within the scope of the appended claims may occur to persons skilled in the art to which this invention pertains.

I claim:

1. A wrapper sheet comprising, a flexible base sheet of inherently thermoplastic material having opposed marginal areas thereof coated in an interrupted pattern with a material having greater heat resistance than the base sheet, said pattern extending completely along said marginal areas.

2. A wrapper sheet comprising, a flexible base sheet of inherently thermoplastic film adapted to heat seal at specified temperatures and having opposed marginal areas thereof coated with a material having a higher melting point and greater resistance to heat than said film, the coating being applied in a discontinuous pattern extending completely along said marginal areas to provide a multitude of uncoated spaces within said coated areas.

3. A wrapper sheet comprising, a flexible base sheet of inherently thermoplastic film having marginal areas thereof coated in an open mesh pattern with diagonal strips of a material having greater heat resistance than said film to provide open uncoated spaces within the mesh pattern along said marginal areas.

4. A wrapper sheet comprising, a flexible base sheet of inherently thermoplastic film having marginal areas thereof coated in a discontinuous pattern with a lacquer having greater heat resistance than said film to provide a multitude of uncoated heat sealable spaces within said marginal areas.

5. A package comprising, a wrapper folded about a commodity with extending end portions thereof folded into overlying condition, said wrapper being formed of inherently thermoplastic sheet material with adjacent surfaces of the overlying portions thereof being provided with a discontinuous coating of a material having greater heat resistance than said sheet and being sealed by heat and pressure entirely within the overlying and coated area, the resultant seal being interrupted by said coating.

6. A package comprising, a wrapper folded about a commodity with extending marginal end portions thereof folded into overlying condition, said wrapper being formed of inherently thermoplastic sheet material with adjacent surfaces of the overlying portions thereof being provided with a discontinuous coating of a material having greater heat resistance than said sheet and being sealed in an interrupted pattern by heat and pressure entirely within the overlying and coated area.

References Cited in the file of this patent

UNITED STATES PATENTS

| | | |
|---|---|---|
| 1,103,177 | Dye | July 14, 1914 |
| 1,746,006 | Metzger | Feb. 4, 1930 |
| 2,133,946 | Bloomer | Oct. 25, 1938 |
| 2,185,469 | McDonald | Jan. 2, 1940 |
| 2,185,470 | McDonald et al. | Jan. 2, 1940 |
| 2,334,600 | Boysen | Nov. 16, 1943 |
| 2,515,423 | Ptasnik | July 18, 1950 |
| 2,754,865 | Moore | July 17, 1956 |
| 2,764,283 | Stanton | Sept. 25, 1956 |
| 2,810,507 | Saunders | Oct. 22, 1957 |

OTHER REFERENCES

"Food Engineering," October 1952, p. 158. (Copy in Scientific Library.)